(12) United States Patent
Martinez (10) Patent No.: US 10,716,004 B2
(45) Date of Patent: *Jul. 14, 2020

(54) DEVICE HAVING A SIM CARD COMBINED WITH A WIRELESS SERVICE CARD AND METHOD OF USE THEREOF

(71) Applicant: TracFone Wireless, Inc., Miami, FL (US)

(72) Inventor: Alma Martinez, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/580,527

(22) Filed: Sep. 24, 2019

(65) Prior Publication Data

US 2020/0021985 A1    Jan. 16, 2020

Related U.S. Application Data

(63) Continuation of application No. 16/196,625, filed on Nov. 20, 2018, now Pat. No. 10,425,816, which is a continuation of application No. 15/873,265, filed on Jan. 17, 2018, now Pat. No. 10,136,321, which is a continuation of application No. 14/882,877, filed on Oct. 14, 2015, now Pat. No. 9,877,191.

(60) Provisional application No. 62/064,185, filed on Oct. 15, 2014.

(51) Int. Cl.
*H04W 8/18* (2009.01)
*H04W 12/06* (2009.01)
*H04L 29/06* (2006.01)
*H04W 12/08* (2009.01)

(52) U.S. Cl.
CPC ......... *H04W 12/06* (2013.01); *H04L 63/0853* (2013.01); *H04W 8/18* (2013.01); *H04W 12/08* (2013.01)

(58) Field of Classification Search
CPC ....... H04W 12/06; H04W 12/08; H04W 8/18; H04L 63/0853
See application file for complete search history.

(56) References Cited

U.S. PATENT DOCUMENTS

| | | | |
|---|---|---|---|
| 9,883,374 B2 | 1/2018 | Brooks et al. | |
| 2008/0251587 A1* | 10/2008 | Martinent | G06K 19/07739 235/492 |

(Continued)

*Primary Examiner* — Chuong A Ngo
(74) *Attorney, Agent, or Firm* — BakerHostetler (57) ABSTRACT

A process for authorizing wireless service includes providing a generally flat form factor card having a first surface and opposing second surface, providing at least one removable subscriber identity module (SIM) card arranged in the generally flat form factor card defined by the first surface, where the at least one removable subscriber identity module is releasably attached to the first surface of the generally flat form factor by respective breaking tabs. The process further includes providing an activation code arranged on the first surface, the activation code is associated with the at least one SIM card, wherein the activation code is configured to authorize wireless service associated with the at least one SIM card when provided to a wireless service provider, and provisioning wireless service to a wireless device from a wireless network. An activation card is also disclosed.

20 Claims, 5 Drawing Sheets

(56) References Cited

U.S. PATENT DOCUMENTS

2013/0116010 A1* 5/2013 Lepp .................... G06K 19/072
455/558
2013/0304642 A1* 11/2013 Campos ................ G06Q 20/36
705/41
2016/0352922 A1* 12/2016 Patel .................... H04W 8/265

* cited by examiner

DEVICE HAVING A SIM CARD COMBINED WITH A WIRELESS SERVICE CARD AND METHOD OF USE THEREOF

CROSS REFERENCE TO PRIOR APPLICATIONS

This application is a continuation of U.S. patent application Ser. No. 16/196,625 filed Nov. 20, 2018, which issued as U.S. Pat. No. 10,425,816 on Sep. 24, 2019; which is a continuation of U.S. patent application Ser. No. 15/873,265 filed Jan. 17, 2018, which issued as U.S. Pat. No. 10,136,321 on Nov. 20, 2018; which is a continuation of U.S. patent application Ser. No. 14/882,877 filed Oct. 14, 2015, which issued as U.S. Pat. No. 9,877,191 on Jan. 23, 2018. This application further claims the benefit from U.S. Provisional Application No. 62/064,185 filed on Oct. 15, 2014, which is hereby incorporated by reference for all purposes as if fully set forth herein.

BACKGROUND OF THE DISCLOSURE

1. Field of the Disclosure

The disclosure relates to a device and method for providing wireless services on wireless devices. More particularly, the disclosure relates a device and method for providing wireless services on wireless devices in conjunction with a SIM (subscriber identity module or subscriber identification module) card combined with a wireless service card.

2. Related Art

A large number of wireless service plans exist for customers desiring wireless cellular services such as data, talk, and text messaging. Customers generally have the option of entering into a post-paid service, e.g., contract for a period of time, or a pre-paid, contract-free service. A Mobile Virtual Network Operator (MVNO) is a network operator that typically does not own its own frequency spectrum or have its own wireless network infrastructure. MVNOs negotiate and enter into business agreements with third party wireless carriers to purchase the right to use their networks for wireless services including a volume of data, number of minutes of air time (voice calling), and number of text messages used.

MVNOs often implement wireless service cards, also known as airtime cards or activation cards, for purchasing and/or adding wireless service, e.g. talk airtime, service days, data, or text messaging for a particular wireless device. Activation cards generally include a unique code that may include a scratch off coating obscuring the unique code consisting of a long series of numbers and/or letters. The codes are correlated to a wireless service and are stored in a MVNO's database prior to distributing the activation card to a respective point-of-sale and reaching the customer. Once a card is sold to a user, the user must manually scratch off the covering of the code and manually enter the code into the phone or in a computer linked to the MVNO's database to activate and/or providing the wireless service for a wireless device. The airtime card may also be sold packaged with a separate SIM card or the SIM may be sold separately.

By having to carry SIM cards and activation cards separately, a retailer would have to carry a large inventory of cards and need large shelf space, thereby, causing unnecessary expense. Thus, there is a need to reduce the requirement of a large inventory of SIM and activation cards.

SUMMARY OF THE DISCLOSURE

The foregoing needs are met, to a great extent, by the disclosure, providing a device and associated methods for providing wireless services on wireless devices and/or systems by implementing a SIM card built into an activation code card.

According to aspects of the disclosure, a process for authorizing wireless service that includes providing a generally rectangular flat form factor card having a first surface and opposing second surface, providing at least one removable subscriber identity module (SIM) card arranged in the generally rectangular flat form factor card defined by the first surface, wherein the at least one removable subscriber identity module is releasably attached to the first surface of the generally rectangular flat form factor by respective breaking tabs, and providing an activation code arranged on the first surface, the activation code is associated with the at least one SIM card, wherein the activation code is configured to authorize wireless service associated with the at least one SIM card when provided to a wireless service provider, and provisioning wireless service to a wireless device from a wireless network when the wireless device operates in conjunction with the at least one SIM card and the activation code is provided to a system associated with the wireless network.

According to aspects of the disclosure, a wireless service card for authorizing a wireless service includes a generally rectangular flat form factor having a first surface and opposing second surface, at least one removable subscriber identity module (SIM) card arranged in the generally rectangular flat form factor defined by the first surface, wherein the at least one removable subscriber identity module is releasably attached to the first surface of the generally rectangular flat form factor by respective breaking tabs, and an activation code arranged on the first surface, the activation code is associated with the at least one SIM card, wherein the activation code is configured to authorize wireless service associated with the at least one SIM card when provided to a wireless service provider.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

In this specification and claims it is to be understood that reference to a "wireless device" is intended to encompass any compatible computing device that can connect to a wireless communication network, such as mobile phones, personal computers, PDAs, hotspots, tablet computers, gaming systems, MP3 players, mobile equipment, mobile stations, cellular phones, smartphones, handsets, (e.g., Apple iPhone, Google Android, Microsoft Windows or Blackberry based devices, other types of PDAs or smartphones), wireless dongles, fall detection devices, security systems, devices implemented as Internet of things (IOT), other mobile computing devices and the like. The term "wireless device" may be interchangeably used and referred to herein as "wireless handset," "handset," "mobile device," "device," "mobile phones," "mobile equipment," "mobile station," "user equipment," "cellular phone," "smartphones," or "phone."

A "point-of-sale" as used herein can refer to a location where one or more wireless devices and/or services can be sold and/or activated which may or may not require sales personnel. A point-of-sale can include, for example, a vending machine, an automated kiosk, a retailer store, a kiosk in a mall, a gas station, a convenience store, a web site, and the like. The point-of-sale can further include a web-based retailer.

Wireless devices may connect to a "wireless network" or "network" and are intended to encompass any type of wireless network to obtain or provide wireless phone services through the use of a wireless device, such as the Global System for Mobile Communication (GSM) network, Code-Division Multiple Access (CDMA) network, 4G Long-Term Evolution (LTE) network, 5G network (fifth-generation wireless network), a network associated with a communication channel as defined herein, that may utilize the teachings of the disclosure to sell, activate, monitor, redeem, and/or track, the usage of one or more wireless services.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not for other aspects.

Figure 1:
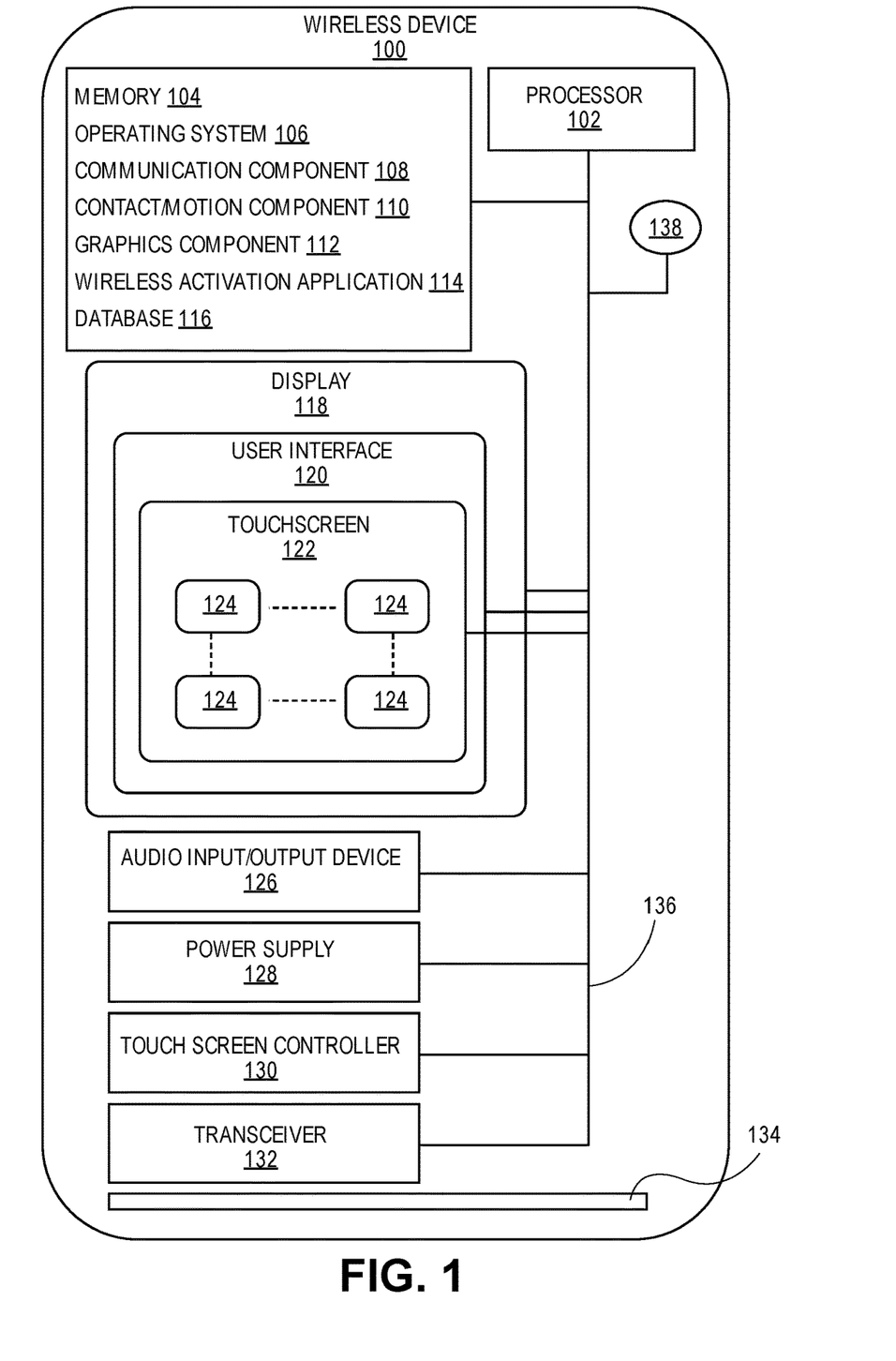
FIG. 1 illustrates a schematic of a wireless device with exemplary components in accordance with aspects of the disclosure.

Referring now to FIG. 1, a schematic with exemplary components of a wireless device 100 in accordance with aspects of the disclosure is shown. In particular, the exemplary components may include a near field communication interface 134, e.g., reader or scanner, which may be used in conjunction with one or more near field communication tag(s) (shown in FIG. 3B) during the distribution, verification, and/or sale/purchase, of wireless service. Other uses of the near field communication interface 134 may include, but are not limited to, a change of phone settings, an activation message (e.g. text message) to be created and sent and ultimately received back, starting of an application (e.g. payment app.), other communication type, and the like.

In addition, the wireless device 100 can include a power supply 128 in the form of a battery and a camera 138 that is multifunctional. The camera may be used to capture images such as of a person or place, biometric readings such as a fingerprint or a retina, letter, symbols, and numbers (optical character reading), image of a bar code such as QR code, and the like. The camera 138 may be on the front, back, sides and the like of the wireless device 100.

The near field communication interface 134 and the camera 138 can be in communication with a processor 102, memory 104, and a user interface 120. The processor 102 may be a central processing unit configured to execute instructions such as instructions related to software programs. Any processor such as a FPGA, an ASIC, a controller, and the like can be used in the wireless device 100 as understood to those of ordinary skill in the art. The display 118 may be a liquid crystal display (LCD), LED (light emitting diodes), OLED, and the like. Preferably, the LCD includes a backlight to illuminate the various color liquid crystals to provide a more colorful display. The user interface 120 may be any type of physical input as readily employed in the field. For example, the user interface 120 may have physical buttons having alphanumeric labels thereon that can be used to enter a sequence of numbers, letters, symbols, or a combination thereof. Alternatively, the user interface 120 may be implemented on a touchscreen 122 having a motion sensor (not shown), and the like.

The memory 104 of the wireless device 100 may further include an operating system 106 (Windows, Apple IOS, Google Android, etc.), a communication component 108, a contact/motion component 110, a graphics component 112, a wireless service activation application 114, a database 116, and the like. The operating system 106 together with the various components provides software functionality for each of the components of the wireless device 100. The memory 104 may include a high-speed, random-access memory. Also, the memory 104 may be a non-volatile memory, such as magnetic fixed disk storage, SIM, UICC, cloud-based memory, flash memory or the like. These various components may be connected through various communication lines including a data bus 136.

The wireless device 100 can include an audio input/output device 126. The audio input/output device 126 may include speakers, speaker outputs, and the like, providing sound output; and may include microphones, microphone inputs, and the like, for receiving sound inputs. In an exemplary aspect, the audio input/output device 126 may include an analog to digital converter and a digital to audio converter for audio input and output functions, respectively.

The wireless device 100 may include a transceiver 132 that provides radio and signal processing as needed to access a wireless network for services. The processor 102 may be configured to process call functions, data transfer, and the like and provide an array of services, based on those functions, to the user.

In an exemplary aspect, the touchscreen 122 of the disclosure may be implemented in the display 118 (entire or a portion thereof) or separate from the display, and may detect a presence and location of a touch of finger or hand of a user within the display area. The touchscreen 122 may also sense other passive objects, such as a stylus. The touchscreen 122 may be controlled by a touchscreen controller 130.

In one operation, the display 118 may show various objects 124 associated with applications for execution by the processor 102. For example, a user may touch the display 118, particularly the touchscreen 122, to interact with the objects 124. That is, touching an object 124 may execute an application stored in the memory 104 by the processor 102 and associated with the object 124. Additionally or alternatively, touching an object 124 may open a menu of options to be selected by the user. The display 118 may include one or of a plurality of objects 124 for the user to interact with. Moreover, the display 118 may include a plurality of screens and show one or more screens at a time. The user may interact with the display 118 to move a screen into view on the display 118. Various objects 124 may be located in each of the screens.

The touchscreen 122 may be implemented as a resistive touchscreen, a surface acoustic wave touch screen, a capacitive touchscreen, self-capacitance sensors, infrared sensors, dispersive signal technology, acoustic pulse recognition, or the like.

The display 118 is generally configured to display a graphical user interface (GUI) 120 that provides an easy to use visual interface between a user of the wireless device 100 and the operating system 106 or application(s) running on the wireless device 100. Generally, the GUI presents programs, files, and operational options with graphical images. During operation, the user may select and activate various graphical images displayed on the display 118 in order to initiate functions and tasks associated therewith.

In another aspect of the disclosure, the memory 104 of a wireless device 100 can include the database 116 for storing user information and activation codes (valid and not used, currently used, previously used) or information. The user information may include full name, address, email address, contact number, credit card information, and the like. In one aspect, the database 116 may include security questions. In another aspect, the database 116 may include user specified preferences.

In yet another aspect of the application, the memory 104 of a wireless device 100 can include a wireless service activation application 114. The application 114 may be preinstalled or downloaded from an application store (Android Store, Blackberry Store, Windows Store or Apple iTunes and the like). The wireless service activation application 114 may be configured to control use of the wireless device 100 based on interaction with a wireless provider backend system 422 (shown in FIG. 4) and/or one or more near field communication tag(s) (shown in FIG. 3B) and/or an activation code, such as a bar code or an alpha numeric code, for the activation of a wireless service. The wireless service activation application 114 may utilize an internal accounting module to establish an account with a representation of prepaid funds or available credit for wireless services. In some aspects, the internal accounting module of the wireless service activation application 114 may also be used to store and/or transmit a plurality of charge rates as well as a billing/payment algorithm. The internal accounting module can classify each wireless service (data, voice, SMS) into one of a plurality of billing categories; receive data correlated to the near field communication tag(s) identifier or activation code (entered or captured by the camera, for example), select a charge rate corresponding to that billing category; calculate an appropriate charge for the data usage, voice usage, and SMS usage in real time by using the selected charge rate; and apply this appropriate charge to the account. For example, upon the retrieval and/or verification of a unique identifier of a near field communication tag by the near field communication interface 134 or an activation code captured by the camera 138 or entered via the user interface 120, the one or more steps may automatically take place to apply an appropriate charge or credit to the account.

Figure 4:
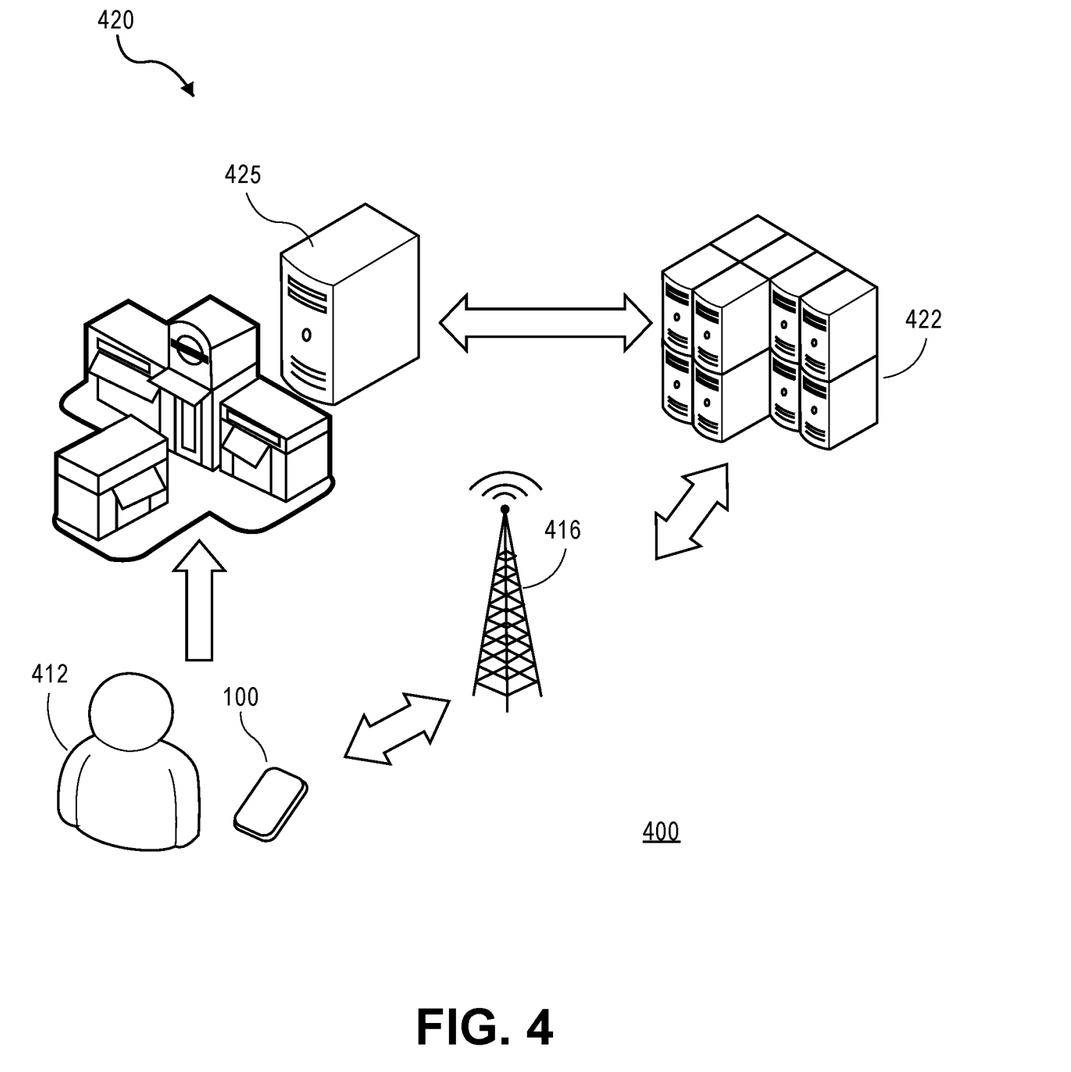
FIG. 4 illustrates a schematic diagram of an exemplary wireless service activation system in accordance with aspects of the disclosure.

In some aspects, once the internal accounting module determines that the amount of wireless service (data, voice, SMS) used has depleted the account to zero or a predetermined amount, the processor 102 may interact with the internal accounting module and/or the wireless provider backend system 422 to limit, prevent, alert the user, and/or control further use of the wireless device 100 as further described herein. The controlled use can include suspending voice calls, allowing limited voice calls, allowing all voice calls, suspending text messages, allowing limited text messages, allowing all text messages, suspending wireless data service, limiting wireless data service, throttling wireless data service, and allowing all wireless data service. In this aspect, the wireless service activation application 114 may also include a module for one or more system provider host processors, which store wireless device identification information; store operating codes needed for wireless device activation; and store operating codes needed for setting prepaid funds or available credit amounts in wireless device accounts whereby, upon receipt of wireless device identification information from a near field communication tag or an activation code, the host processor may be capable of ascertaining the operating codes needed to activate that particular wireless device or needed to set its account amount.

Figure 2A:
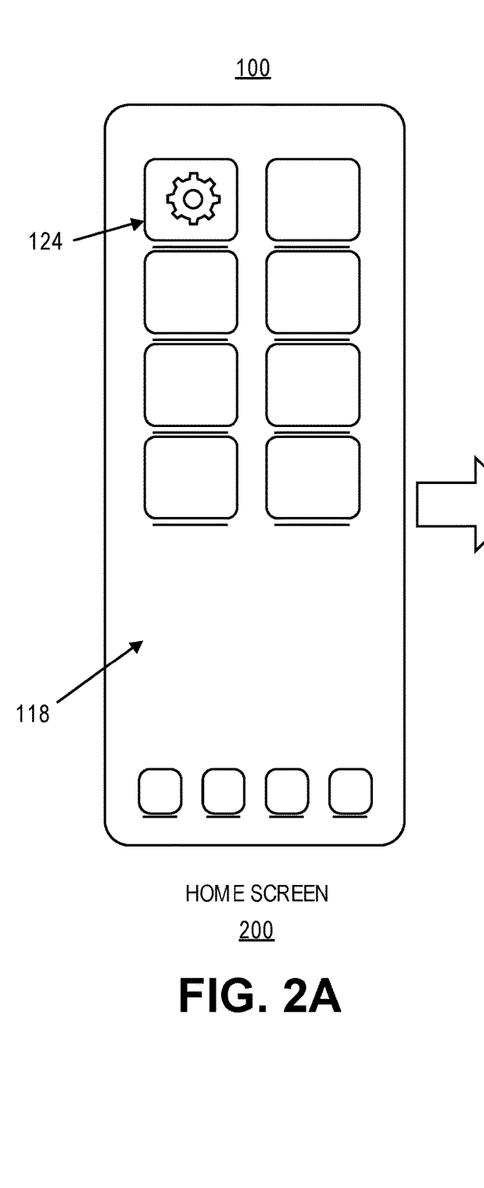
FIG. 2A illustrates an exemplary wireless device with a display of a home screen and FIG. 2B illustrates a subsequent screen of a wireless service activation application with a graphical user interface, both which may be used for a selection and control of the services associated with a wireless service in accordance with an aspect of the disclosure.
Figure 2B:
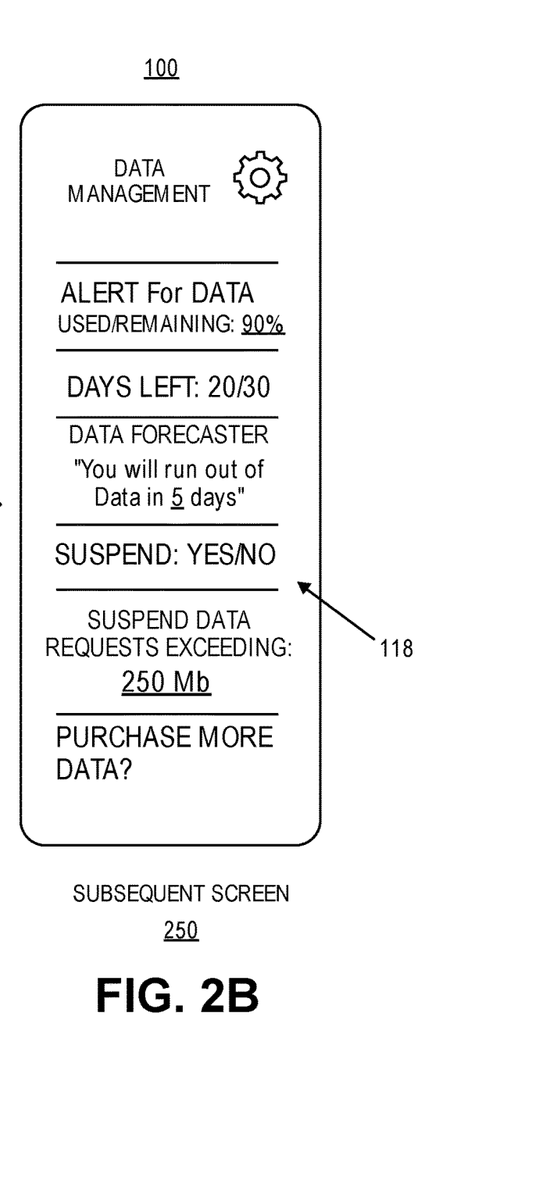

FIG. 2A illustrates an exemplary wireless device 100 with a display of a home screen 200 and FIG. 2B a subsequent screen 250 of a wireless service activation application 114 with a graphical user interface, both which may be used for the selection and control of the activation of a wireless service in accordance with an aspect of the disclosure. The home screen 200 may include a plurality of icons, e.g. 124, and is not limited to a calling icon, texting icon, internet icon, and the like, allowing a user to perform one or more functions on the wireless device 100. For example, the home screen 200 may also display icons for one or more applications that have been downloaded from the Internet or pre-installed, and unlocked/retrieved using one or more near field communication tag(s) or an activation code. In some aspects, an application such as Google Wallet™, Google Play™, Android Market™, Apple Store™, or the like, may also function with the one or more near field communication tag(s) or activation code to process or credit a payment or redeem a credit (contest give away), add or redeem gift card value, add or redeem coupons or other data during the activation of one or more selected wireless service.

Some of the payment and/or authentication applications may be stored in a robust manner that prevents a user from deleting, modifying, tampering, and the like, with the application's functionality. In this regard, the wireless service activation application 114, for example, can provide data management information, as depicted in subsequent screen 250, but may not allow or limit user's input for the activation and/or control of the wireless services. Further, in some aspects the provision of the options depicted in the subsequent screen 250 to the user may only be made available during activation of a wireless service and verification of a unique identifier of a near field communication tag or the activation code.

Figure 3A:
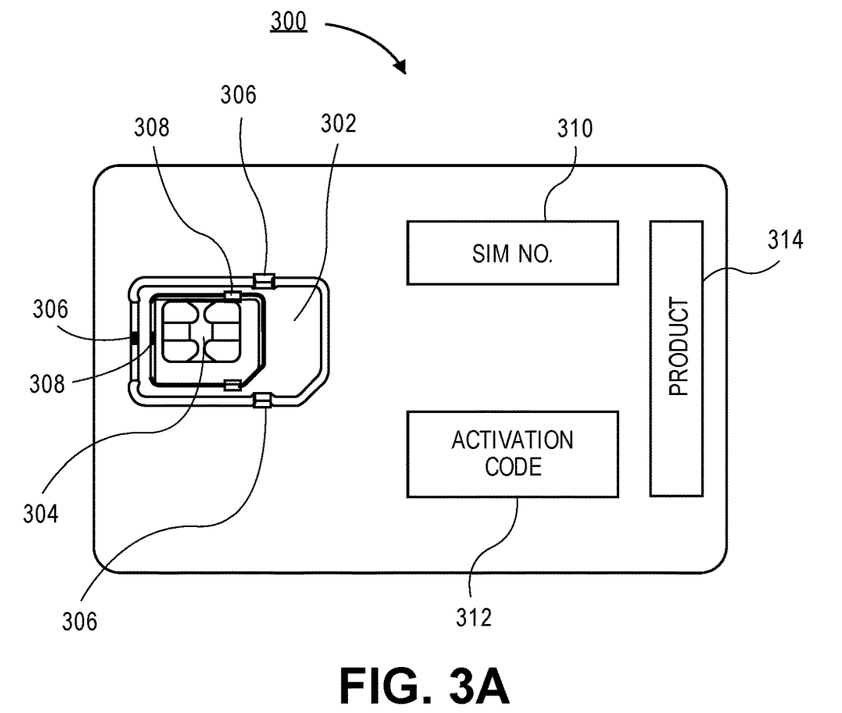
FIG. 3A illustrates a SIM card built into an activation card in accordance with an aspect of the disclosure.

Referring now to FIG. 3A, an activation card 300 used for authentication of wireless device 100 on a wireless service that includes a SIM card 302 built in as depicted. As customers often own their wireless device 100, they need a SIM card 302 in order to authenticate the device on a particular wireless service provider. Additionally, a second SIM card 304, which is smaller than SIM card 302, can also be included with the activation card 300 in order to accommodate the wireless device 100 having the smaller SIM card slot. SIM card 302 is configured to be removable from activation card 300 by breaking one or more tabs 306 in a known manner and the SIM card 304 similarly can be removed from the SIM card 302 and/or the activation card by breaking one or more tabs 308. In one aspect of the disclosure, the activation card may be used to add airtime to hot spot devices, home alarm systems, vehicle diagnostic and monitoring systems and the like.

In an aspect of the disclosure, the activation card 300 having the SIM card 302, 304 may include a SIM card number 310 in the form of as a series of numbers, letters, symbols or a combination thereof. The SIM card number 310 may also be in the form of bar code or even part of a near field communication tag 320. The SIM card number 310 may be valid for activation of SIM card 302, or 304 or both according to aspects of the disclosure. Activation code 312 may be included on the activation card 300 in order to activate one or more services for the wireless device 100. The activation code 312 may be located under a scratch-off panel and can be manually entered into the wireless device 100 using the user interface 120 or captured as an image with the camera 138. The activation code 312 can be pre-paid or includes a predetermined amount of credit for one of more wireless services. The activation code 312 can be unique to one SIM card 302 or can be shared by SIMS 302, 304. A product code 314 can also be included on the activation card so that the retail store or point of sale location can keep track of the activation and SIM cards as part of its inventory. As should be understood, the SIM card number 310, the activation code 312, the product code 314 and any other codes and the like can be a series of numbers, letters, symbols and a combination thereof, be in the form of a bar code or be contained in the near field communication tag 320.

The SIMS 302, 304 may be implemented as one or more of a Full-size (1FF) (standard reference ISO/IEC 7810: 2003), Mini-SIM (2FF) (standard reference ISO/IEC 7810: 2003, ID-000), Micro-SIM (3FF) (standard reference ETSI TS 102 221 V9.0.0, Mini-UICC), and/or Nano-SIM (4FF) early 2012 (standard reference ETSI TS 102 221 V11.0.0). The SIMS 302, 304 may be internationally identified by their integrated circuit card identifier (ICCID). The SIMS 302, 304 may an Issuer identification number (IIN). The SIMS 302, 304 may include an Individual account identification. The SIMS 302, 304 may include an International mobile subscriber identity (IMSI). The SIMS 302, 304 may include an Authentication key (Ki). The Ki is a 128-bit value used in authenticating the SIMs on the mobile network.

In another aspect and as stated herein, a bar code may also be used as an alternative and can include the same series of numbers, letters, symbols, or a combination thereof. The bar code can be scanned using the camera 138 or alternatively a bar code reader (not shown) can be attached to the wireless device 100. The bar code has previously been recorded and correlated to a predetermined credit amount for a particular wireless service/wireless services packet, in a backend system's database. Further, the bar code can include credit for all services such as talk, text, and data or can be limited to one or any combination thereof as desired.

Figure 3B:
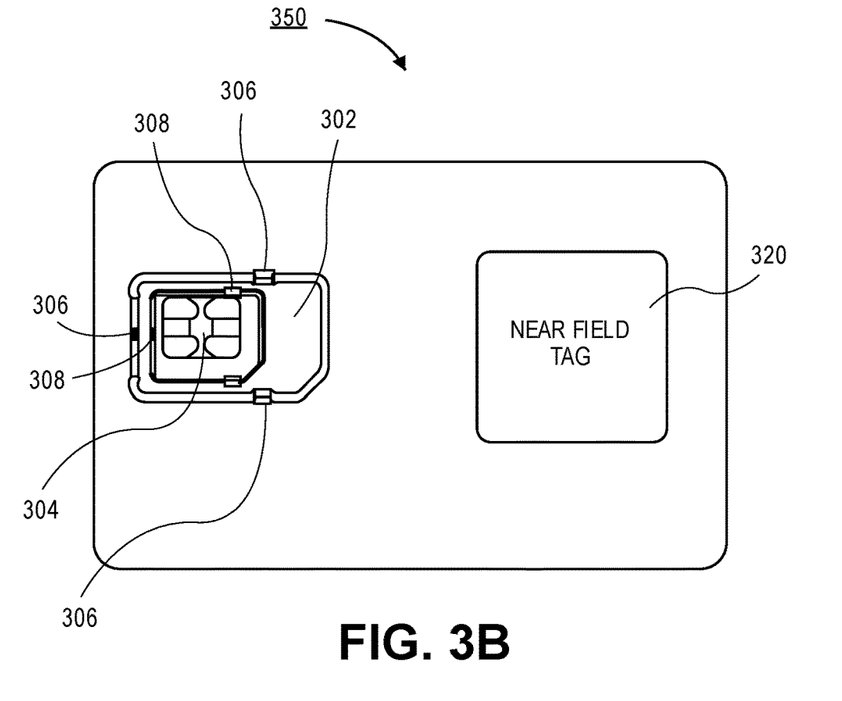
FIG. 3B illustrates a SIM card built into an activation card having a near field communication tag that can be used according to aspects of the disclosure.

Referring now to FIG. 3B, the activation card 350 having SIM cards 302, 304 and having a near field communication tag 320 according to aspects of the present disclosure is illustrated. In some aspects, one or more near field communication tags 320 can be included on the activation card 350. Alternatively or in addition to the near field communication tag can be on one or more SIM cards 302, 304. The near field communication tag 320 may have either read only data capability or may have rewriteable data capability. As such, configurability, memory, security, data retention and write endurance, may all vary according to the activation application. The variations of the near field communication tags included and number of tags which can be utilized to streamline the wireless service activation process, provide a more secure sale and activation process, provide for less data storage in backend databases, post distribution programmability of the airtime cards, accurate inventory, and eliminate point-of-sale requirements.

According to some aspects of the disclosure, a near field communication equipped wireless device 100, e.g. smart phone, can be paired with the near field communication tag 320 to automate a task including, for example, a change in phone settings, a text to be created and sent, validate SIM cards, activation services including wireless services on the wireless device 100, an application to be launched, or any number of commands to be executed including for the purchase/sale, payment, activation of a wireless service, and/or monitoring of wireless services sold/authorized. These automated tasks may also be performed based on the SIM card number 310, the activation code 312, the product code 314 and any other codes.

Further, by simply bringing the near field communication enabled wireless device to a distance of 10 cm or less, the activation and/or purchase of wireless services can be automated and streamlined. For example, quicker verification of codes can result since the system is more secure and the need of storing all unique codes and correlated services on a backend system's database prior to distribution is eliminated.

Referring now to FIG. 4, a schematic diagram of an exemplary wireless service system according to aspects of the disclosure is depicted. In particular, the wireless service system 400 can be used to activate, provision, and/or provide wireless network service(s) on the wireless device 100 implementing various aspects of the SIM card 302, 304 and activation card 300, 350 using the disclosed code and/or near field communication systems. Unlike conventional activation processes for wireless devices that can require a user 412 to contact a live customer service representative, utilize an interactive voice response system from a landline or another wireless device, or access an Internet website by the user 412 to use a website activation system, the present wireless service system 400 may be used to activate a wireless device 100 and/or activate services with automated code/information gathering and without requiring access to an agent, or a website.

According to aspects of the disclosure, the activated service(s) may include, for example, activation of a wireless service after or during the initial activation of the wireless device 100 by a user 412. The initial activation of the wireless device 100 may be described herein as "out of the box" activation and may take place at the point-of-sale 420. In some additional aspects, the services requested to be activated and authorized are one or combinations of: airtime, text messaging, and data plans, but may also include at least one of device upgrades, device reactivations, wireless number changes, and wireless number porting for wireless devices that have previously been activated.

According to some aspects of the disclosure, the point-of-sale 420 can include, for example, a store retailer, a vending machine, a kiosk, a web-based retailer, and the like. The point-of-sale can provide the SIM card 302 and/or SIM card 304 built in the activation card 300, 350 depending on the desired activation. In an aspect of the disclosure, the activation card 300, 350 may both include the activation code 312 and the near field communication tag 320. When the user is ready to activate the activation card 300, 350, he can simply enter the activation code 312 into the wireless device 100 using the user interface 120. Alternatively, the user can take a picture of the activation code 312 or scan the equivalent bar code using the camera 138. Then the user inserts the SIM card 302, 304 into the wireless device 100. Then through the user interface 120 or touchscreen 122, the user 412 can activate the wireless device 100 using the wireless service activation application 114. The SIM card 302, 304 can be configured to solely communicate with a wireless network provider using limited data communication even though the SIM card 302, 304 has not been authenticated. In one aspect, the wireless service activation application 114 communicates with the wireless network provider backend system 422 through a cell tower 416. Then the wireless network provider backend system 422 authenticates (permanently) the SIM card 302, 304 and authorizes the predetermined number of talk time, text, or data or a combination thereof based on the activation code 312 or the code stored on bar code or near field communication tag 320.

Alternatively, the wireless network provider backend system 422 may also include an interface with other authentication or payment services such as Google Wallet™, Google Play™, Android Market™, Apple Store™, or the like. Additionally, the wireless service activation application 114 can simply request the user to enter his ZIP Code or use associated the global navigation satellite system (GNSS) location (e.g., global positioning system) in the wireless device 100 in order to authorize and activate the SIM card 302, 304 based on location or billing area.

In another aspect, the wireless service activation application 114 can simply access the database 116 stored on the wireless device 100 in order to authenticate and authorize the SIM card 302, 304. The database 116 can be previously stored on the wireless device 100 and can be supplemented via access to the wireless network provider backend system 422 or simply downloaded at the time of activation.

The point-of-sale 420 may also include a near field communication system 425 that can be used for payment and/or executing security and activation protocols using one or more near field communication tag(s) 320. Further, the near field communication system 425 at the point-of-sale 420 can be configured to communicate with the near field communication tag 320 and in some aspects the wireless device 100, which may also be configured to be in communication with a wireless network provider backend system 422. Communication with the wireless device 100 may include, for example, one or more of: communication using the wireless device's near field communication interface 134, a wire connector, a data messaging channel, such as an Unstructured Supplementary Service Data (USSD) channel, a Short Message Service (SMS) messaging channel or a Wireless Application Protocol (WAP) messaging channel, a personal area network (PAN), such as a Bluetooth™ communication, an induction wireless communication, an infrared wireless communication, an ultra-wideband communication, a ZigBee™ communication, a wireless fidelity communication channel, a local area network (LAN) and/or a communication channel as defined herein.

Communication between the near field communication system 425 of the point-of-sale 420 and the wireless device 100 may be used to transmit a payment or redeem a credit for a wireless service and/or automatically retrieve and/or generate wireless device-related information based on a user's input selection. According to some aspects of the present disclosure, the wireless service selection can be made by scanning a near field communication tag 320 of the activation card 350 using the near field communication interface 134 of the wireless device 100, and can include a wireless provider selection, and/or a wireless service type and amount to be activated. In some aspects, the near field communication tag 320 can further be scanned by the near field communication system 425 at the point-of-sale 420, for example, for verification, authorization, and/or security encryption.

The wireless service selection, near field communication tag 320 unique identifier, and wireless device 100 related information may be transferred to a wireless provider backend system 422. The wireless device-related information can include, for example, the International Mobile Station Equipment Identify ("IMEI"), an Electronic Serial Number (ESN), Mobile Equipment Identifier (MEID), and/or a serial number for a subscriber identity module (SIM) card installed in the wireless device 100. The SIM card 302, 304 may include a SIM card memory for storing at least a SIM card serial number, for example, an Integrated Circuit Card ID (ICCID). A wireless device 100 not utilizing a SIM card 302, 304 is contemplated as well for use with the disclosure.

In some aspects, the information transferred may be in the form of an activation message that corresponds and/or includes the wireless provider and/or wireless service selection by the user 412 and automatically retrieved wireless device related information, the near field communication tag 320 unique identifier, and/or payment/authorization verification from the point-of-sale 420. The activation message including the automatically retrieved information can be generated by a processor including, for example, the processor of the wireless device 100 and/or a processor at the point-of-sale 420. In some aspects, the activation message may be transmitted over a provisioning channel provided over a cell tower 416 that is available to inactive or unprovisioned wireless devices or via any type of conventional activation protocols known in the art. Alternatively, the activation message can be transmitted from the point-of-sale 420 via any wired or other wireless communication type to the wireless provider backend system 422. The wireless provider backend system 422 can include one or more databases, one or more servers, wherein authorized unique identifiers of a near field communication tag 320 may be correlated/recorded when a wireless service is redeemed and/or purchased.

Figure 5:
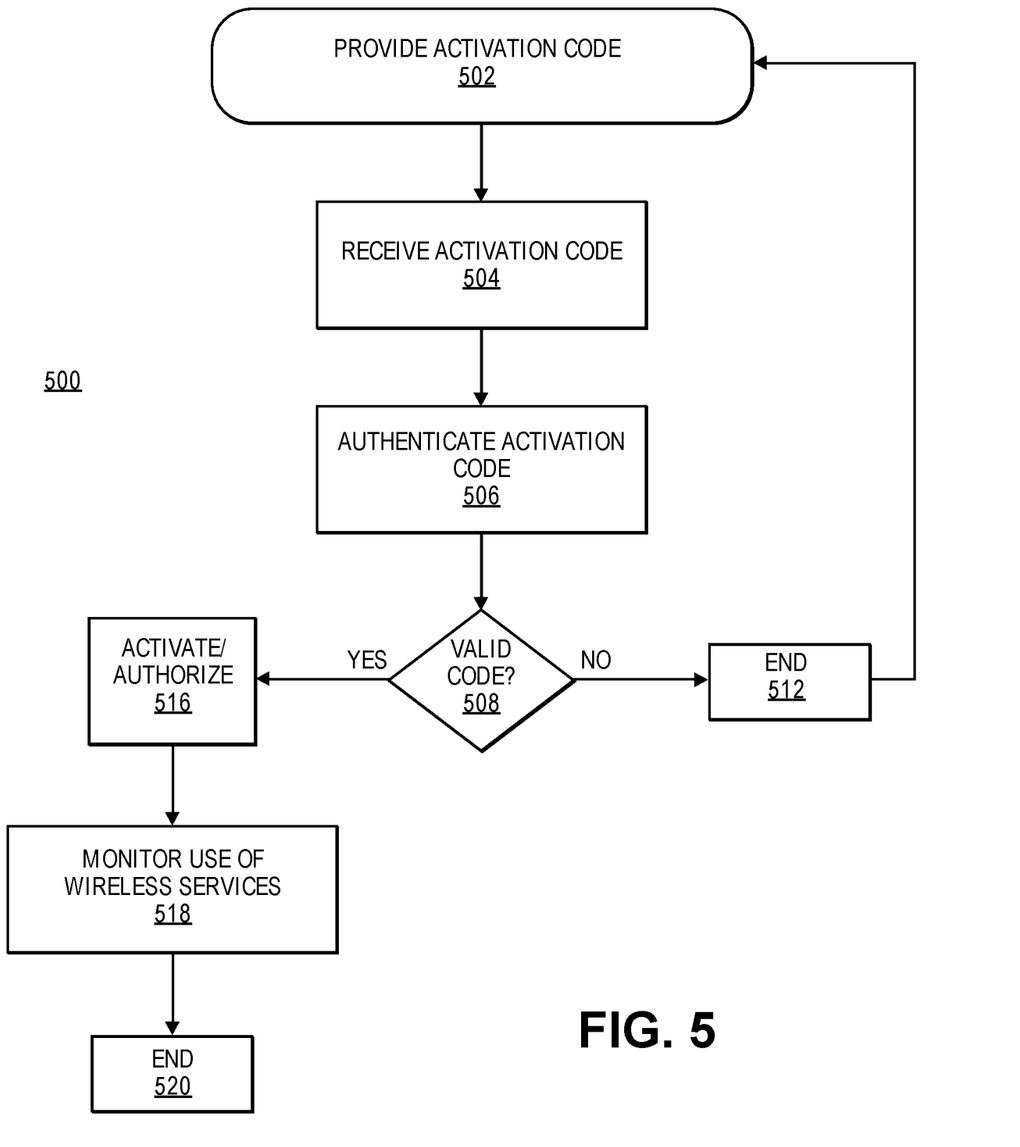
FIG. 5 illustrates exemplary method steps, which may be used to implement the system of the disclosure.

Referring now to FIG. 5, an exemplary method that may be used to implement systems of the disclosure, are depicted in a flowchart 500. In particular, the method includes ways in which a user can provide an activation code 312 located with the activation card 300, 350 to activate one or more wireless service(s) on the wireless device 100. At box 502, the user provides an activation code 312 in the form of a code (letters, numbers, symbols, or combination thereof) that was captured by the camera 138 or manually entered using the user interface 120, bar code captured by the camera 138, or a near field communication tag 320 using the near field communication interface 134. The activation code may include a programmed identifier that can correspond to a wireless provider selection and one or more wireless services to be activated. For example, the identifier may include a first code corresponding to a wireless provider, followed by a second code corresponding to a wireless service type, and followed by a third code corresponding to an amount that is being redeemed. It is contemplated that additional codes may be included for additional services and amounts, security codes, as well as for production data for statistical analysis performed by the wireless provider, as it may be desired. Each of the codes may be a series of digits including letters, symbols, and/or numbers.

At box 504, the activation code 312 can be received by the wireless device 100, or the near field communication interface 134 and/or the near field communication system 425 at the point-of-sale 420. If received by the wireless device 100 and/or the near field communication interface 134, then the wireless device can transmit the activation code to the cell tower 416, which then relays the code to the wireless provider backend system 422 for authentication. If the activation code is received by near field communication system 425 at the point-of-sale 420, then the activation code is sent to the wireless provider backend system 422 for authentication.

At box 508, the activation code 312, bar code, or the near field communication tag 320 codes along with wireless device 100 information are received by the wireless provider backend system 422 where it can verify the authentication code by searching in one or more databases 506. Alternatively, the database can be preloaded on the wireless device 100 and the activation code 312 is authenticated by the wireless device 100 through the wireless service activation application. In one aspect, prior to sending the activation code 312, the bar code or the near field communication tag 320 to the wireless provider backend system 422, a text message containing temporary log in information may be sent to the wireless device for use by the wireless service activation application to log into the wireless provider backend system 422. If the activation code 312 is not valid, the activation of the wireless service will be stopped at box 512. Upon stopping the activation of the wireless service as shown in box 512, the wireless provider backend system 422 may send a warning message to the user 412 (e.g., using the wireless device 100) and/or the wireless provider and proceed back to box 502 and wait for the valid authentication code to be provided. If the activation code 312 is valid (authentic, not been previously used, or the like), authorization of a wireless service may take place at box 516. At box 518, the use of the activated wireless service may be monitored to determine when the activated wireless service has been depleted by the user 412. At box 520 the process ends.

Accordingly, the disclosure provides a device and associated methods for providing wireless services on wireless devices and/or systems by implementing a SIM card built into an activation card. The disclosure avoids retailers having to carry SIM cards and activation cards separately. The disclosure further avoids retailers having to have a large inventory of cards and need large shelf space, thereby, causing unnecessary expense. Moreover, the process of a user activating their wireless device and obtain wireless services is also greatly improved.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092 and those defined by the NFC Forum.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. A process for authorizing wireless service for a wireless device, the process comprising:
    providing a generally flat form factor card having a first surface and an opposing second surface;
    providing at least one removable subscriber identity module (SIM) card arranged in the generally flat form factor card defined by the first surface, wherein the at least one removable subscriber identity module (SIM) card is releasably attached to the first surface of the generally flat form factor card, wherein the at least one removable subscriber identity module (SIM) card is configured to be implemented in the wireless device;
    providing an activation code arranged on the first surface, the activation code being associated with the at least one removable subscriber identity module (SIM) card, wherein the activation code is configured to authorize the wireless service for the wireless device associated with the at least one removable subscriber identity module (SIM) card when provided to a wireless service system associated with a wireless service provider;
    the providing the activation code comprises providing an optically readable code;
    receiving from the wireless device over a network to the wireless service system the activation code obtained with a camera of the wireless device along with wireless device related information associated with the wireless device; and
    provisioning the wireless service to the wireless device from a wireless network when the wireless device operates in conjunction with the at least one removable subscriber identity module (SIM) card and the activation code is provided over the network to the wireless service system associated with the wireless network and the wireless service system authenticates the activation code as being valid.

2. The process of claim 1, wherein the providing the at least one removable subscriber identity module (SIM) card further comprises providing a first removable SIM card and a second removable SIM card, the first removable SIM card comprises breaking tabs and the second removable SIM card comprises breaking tabs, the breaking tabs of the first removable SIM card and the breaking tabs of the second removable SIM card being configured to release the first removable SIM card and the second removable SIM card from the generally flat form factor card by breaking respective breaking tabs.

3. The process of claim 2, wherein the activation code authorizes a predetermined amount of wireless service for the wireless device utilizing one of the first removable SIM card and the second removable SIM card.

4. The process of claim 1, wherein the provisioning the wireless service to the wireless device from the wireless network further comprises:
   receiving the activation code over the network through a provisioning channel to the wireless service system associated with the wireless network and the wireless service system authenticates the activation code as being valid; and
   monitoring the wireless service used by the wireless device to determine when the wireless service has been depleted.

5. The process of claim 1, wherein the activation code authorizes a predetermined amount of wireless service for the wireless device implementing the at least one removable subscriber identity module (SIM) card.

6. The process of claim 1, wherein the optically readable code comprises at least one of the following: a OR code, a bar code, or an alpha numeric code.

7. The process of claim 1, wherein the provisioning the wireless service to the wireless device from the wireless network further comprises:
   receiving the activation code over the network through a provisioning channel to the wireless service system associated with the wireless network and the wireless service system authenticates the activation code as being valid; and
   monitoring the wireless service used by the wireless device to determine when the wireless service has been depleted,
   wherein the activation code authorizes a predetermined amount of wireless service for the wireless device implementing the at least one removable subscriber identity module (SIM) card, and
   wherein the optically readable code comprises at least one of the following: a OR code, a bar code, or an alpha numeric code.

8. The process of claim 1, wherein the provisioning the wireless service to the wireless device from the wireless network further comprises:
   receiving the activation code over the network through a provisioning channel to the wireless service system associated with the wireless network and the wireless service system authenticates the activation code as being valid; and
   monitoring the wireless service used by the wireless device to determine when the wireless service has been depleted,
   wherein the activation code authorizes a predetermined amount of wireless service for the wireless device implementing the at least one removable subscriber identity module (SIM) card.

9. A wireless service card for authorizing a wireless service for a wireless device, the wireless service card comprising:
   a generally flat form factor card having a first surface and an opposing second surface;
   at least one removable subscriber identity module (SIM) card arranged in the generally flat form factor card defined by the first surface, wherein the at least one removable subscriber identity module (SIM) card is releasably attached to the first surface of the generally flat form factor card;
   an activation code arranged on the first surface, the activation code being associated with the at least one removable subscriber identity module (SIM) card, wherein the activation code is configured to authorize the wireless service to the wireless device associated with the at least one removable subscriber identity module (SIM) card when the activation code is provided over a network to a wireless service system associated with a wireless service provider and the wireless service system authenticates the activation code as being valid; and
   the activation code being stored as an optically readable code,
   wherein the optically readable code is configured to be read by a camera of the wireless device; and
   wherein the activation code is configured to be transmitted from the wireless device along with wireless device related information associated with the wireless device over the network to the wireless service system.

10. The wireless service card of claim 9, wherein the at least one removable subscriber identity module (SIM) card comprises a first removable SIM card and a second removable SIM card, the first removable SIM card comprises breaking tabs and the second removable SIM card comprises breaking tabs, the breaking tabs of the first removable SIM card and the breaking tabs of the second removable SIM card being configured to release the first removable SIM card and the second removable SIM card from the generally flat form factor card by breaking respective breaking tabs.

11. The wireless service card of claim 10, wherein the activation code authorizes a predetermined amount of wireless service for the wireless device utilizing one of the first removable SIM card and the second removable SIM card.

12. A wireless device configured to operate utilizing the at least one removable subscriber identity module (SIM) card and the activation code of the wireless service card of claim 9, the wireless device comprising:
   a transceiver configured to provide radio and signal processing;
   a display configured to display various objects;
   a memory configured to store an operating system; and
   a camera configured to capture the optically readable code that comprises the activation code,
   wherein the transceiver is configured to transmit the activation code along with wireless device related information associated with the wireless device over a network to the wireless service system.

13. The wireless service card of claim 9, wherein the activation code authorizes a predetermined amount of wireless service for the wireless device implementing the at least one removable subscriber identity module (SIM) card.

14. The wireless service card of claim 9, wherein the optically readable code comprises at least one of the following: a OR code, a bar code, or an alpha numeric code.

15. The wireless service card of claim 9,
wherein the activation code authorizes a predetermined amount of wireless service for the wireless device implementing the at least one removable subscriber identity module (SIM) card, and
wherein the optically readable code comprises at east one of the following: a OR code, a bar code, or an alpha numeric code.

16. A wireless service card for authorizing a wireless service for a wireless device, the wireless service card comprising:
a generally flat form factor card having a first surface and an opposing second surface;
at least one removable subscriber identity module (SIM) card arranged in the generally flat form factor card defined by the first surface, wherein the at least one removable subscriber identity module (SIM) card is releasably attached to the first surface of the generally flat form factor card; and
an activation code arranged on the first surface, the activation code being associated with the at least one removable subscriber identity module (SIM) card, wherein the activation code is configured to authorize the wireless service for the wireless device associated with the at least one removable subscriber identity module (SIM) card when provided to a wireless service system associated with a wireless service provider, wherein the at least one removable subscriber identity module (SIM) card comprises a first removable SIM card and a second removable SIM card, and the generally flat form factor card is configured to release the first removable SIM card and the second removable SIM card from the generally flat form factor card,
wherein the activation code comprises an optically readable code configured to be read by a camera of a wireless device;
wherein the activation code along with wireless device related information associated with the wireless device are configured to be transmitted from the wireless device over a network to the wireless service system; and
wherein the activation code authorizes a predetermined amount of wireless service for the wireless device utilizing one of the first removable SIM card and the second removable SIM card when the activation code along with wireless device related information associated with the wireless device are provided over the network to the wireless service system associated with a wireless network and the wireless service system authenticates the activation code as being valid.

17. The wireless service card of claim 16, wherein the optically readable code comprises at least one of the following: a QR code, a bar code, or an alpha numeric code.

18. The wireless service card of claim 16, wherein the wireless service includes one or more of:
wireless data, text messaging, or wireless talk time.

19. A wireless device configured to operate utilizing the at least one removable subscriber identity module (SIM) card and the activation code of the wireless service card of claim 16, the wireless device comprising:
a transceiver configured to provide radio and signal processing;
a display configured to display various objects;
a memory configured to store an operating system; and
a camera configured to capture the optically readable code that comprises the activation code,
wherein the transceiver is configured to transmit the activation code over a network to the wireless service system.

20. The wireless service card of claim 16,
wherein the optically readable code comprises at least one of the following: a OR code, a bar code, or an alpha numeric code, and
wherein the wireless service includes one or more of: wireless data, text messaging, or wireless talk time.

* * * * *

UNITED STATES PATENT AND TRADEMARK OFFICE
CERTIFICATE OF CORRECTION

| | |
|---|---|
| PATENT NO. | : 10,716,004 B2 |
| APPLICATION NO. | : 16/580527 |
| DATED | : July 14, 2020 |
| INVENTOR(S) | : Alma Martinez |

It is certified that error appears in the above-identified patent and that said Letters Patent is hereby corrected as shown below:

In the Claims

Column 15, Claim 7, Line 53: "of the following: a OR code, a bar code or an alpha" should be replaced with --of the following: a QR code, a bar code or an alpha--

Column 16, Claim 14, Line 67: "lowing: a OR code, a bar code, or an alpha numeric code." should be replaced with --lowing: a QR code, a bar code, or an alpha numeric code.--

Column 17, Claim 15, Line 7: "of the following: a OR code, a bar code or an alpha" should be replaced with --of the following: a QR code, a bar code or an alpha--

Column 18, Claim 20, Line 34: "of the following: a OR code, a bar code or an alpha" should be replaced with --of the following: a QR code, a bar code or an alpha--

Signed and Sealed this
Thirty-first Day of May, 2022

Katherine Kelly Vidal
*Director of the United States Patent and Trademark Office*